United States Patent
Gordon et al.

(10) Patent No.: US 6,440,256 B1
(45) Date of Patent: Aug. 27, 2002

(54) METHOD OF FORMING AND INSERTING FILTER ELEMENTS IN CUP-SHAPED CONTAINERS

(75) Inventors: Steven J. Gordon, Cambridge; Richard P. Sweeney, Winchester; Anthony J. Christopher, Cambridge; Brett Anderson, Cambridge; A. David Boccuti, Cambridge; Kevin Walsh, Cambridge; Hani Sallum, Cambridge, all of MA (US); David Ramler, Maple Grove, MN (US); Jim Wolf, Chanhassen, MN (US); Mike Helmbrecht, Blaine, MN (US)

(73) Assignee: Keurig, Incorporated, Wakefield, MA (US)

( * ) Notice: Subject to any disclaimer, the term of this patent is extended or adjusted under 35 U.S.C. 154(b) by 10 days.

(21) Appl. No.: 09/597,455

(22) Filed: Jun. 20, 2000

(51) Int. Cl.⁷ ............................ B32B 31/04; B29C 53/50
(52) U.S. Cl. ....................... 156/293; 156/201; 156/204; 156/217; 156/227; 156/267; 156/270; 156/308.4
(58) Field of Search ................. 210/497.01, 497.2, 210/497.3; 99/295, 317; 426/77, 79; 156/293, 267, 269, 270, 200, 201, 217, 227, 199, 204, 308.4

(56) References Cited

U.S. PATENT DOCUMENTS

| | | | |
|---|---|---|---|
| 3,199,275 A | * | 8/1965 | Fesco ........................ 55/521 |
| 3,567,033 A | * | 3/1971 | Whelan ..................... 210/497 |
| 5,637,335 A | | 6/1997 | Fond et al. |
| 5,840,189 A | * | 11/1998 | Sylvan et al. ............ 210/474 |

FOREIGN PATENT DOCUMENTS

| EP | 0062216 A2 | 10/1982 |
|---|---|---|
| EP | 0865749 A1 | 9/1998 |

* cited by examiner

Primary Examiner—Michael W. Ball
Assistant Examiner—Todd J. Kilkenny
(74) Attorney, Agent, or Firm—Samuels, Gauthier & Stevens

(57) ABSTRACT

A method of forming and inserting filter elements into cup-shaped containers comprises the steps of:

a) folding a continuous web of filter material into two adjacent plies which have separable upper edges and are joined one to the other along a bottom fold line;

b) blanking the adjacent plies to form their upper edges into a scalloped pattern;

c) inserting carrier mandrels between the adjacent plies;

d) joining the adjacent plies along seams extending transversely with respect to the bottom fold line to form a series of collapsed frustoconical filter elements interconnected by scrap segments and supported internally by the carrier mandrels;

e) separating the filter elements one from the other by blanking and removing the scrap segments;

f) transferring the filter elements from the carrier mandrels into cup-shaped containers arranged thereberneath; and g) securing the thus inserted filter elements to interior surfaces of the cup-shaped containers.

6 Claims, 4 Drawing Sheets

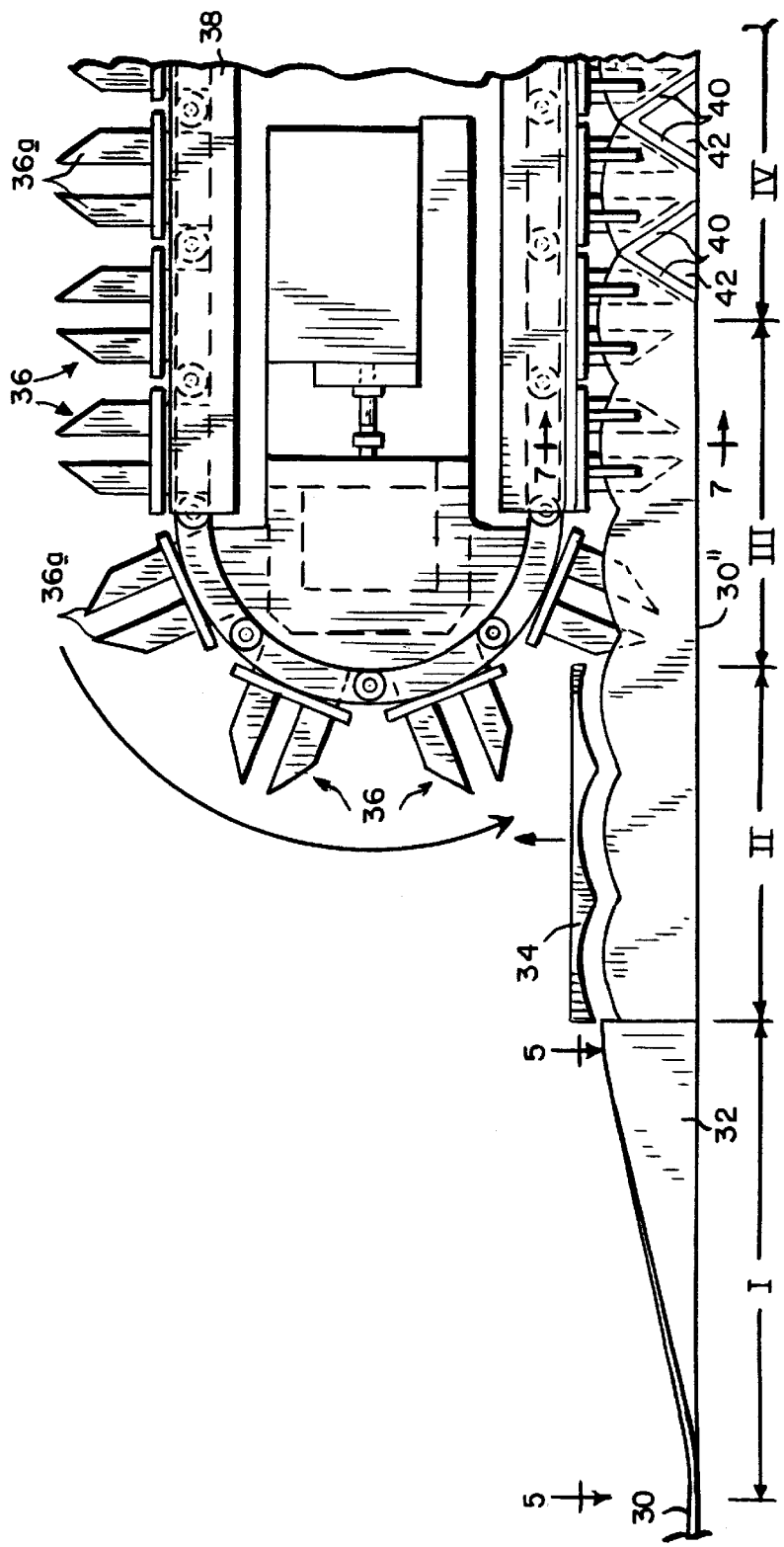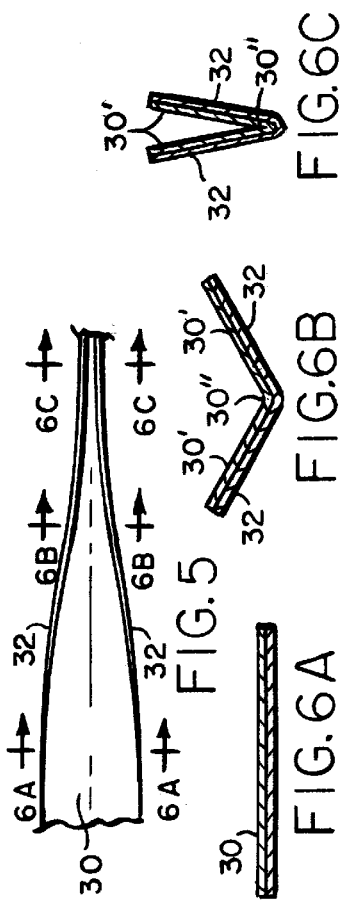

METHOD OF FORMING AND INSERTING FILTER ELEMENTS IN CUP-SHAPED CONTAINERS

FIELD OF INVENTION

This invention relates generally to beverage filter cartridges of the type disclosed in U.S. Pat. No. 5,840,189 (Sylvan et al.), the disclosure of which is herein incorporated by reference in its entirety, and is concerned in particular with an improved method of forming and inserting the filter elements into the cup-shaped containers of such cartridges.

BACKGROUND DISCUSSION

In beverage filter cartridges of the type under consideration, as depicted in FIGS. 1–3, a cup-shaped container "C" has a generally flat bottom 10, a side wall 12 which joins an enlarged diameter collar 14 at a shoulder 16, and an upper rim surrounded by an outwardly extending radial lip 18. An inverted frustroconical filter element "F" subdivides the interior of the container C into first and second chambers 22, 24. An extract "E", which may typically comprise ground coffee, is contained within the filter element F in chamber 22, and a lid "L" is applied to the cup lip 18 to complete the package. The lid L and container C coact to hermetically encapsulate the beverage extract E, and both are yieldably pierceable. In use during a brewing cycle, a tubular inlet probe 26 pierces the lid to admit pressurized hot water into chamber 22 where it infuses the beverage extract to produce a beverage. The beverage passes through the filter into chamber 24 from which it is removed by a tubular outlet probe 28 pierced through the cup bottom 10.

The container C and lid L may be fabricated from commercially available impermeable materials, including plastics, papers, metals such as aluminum, etc. The filter F may comprise one or more layers of permeable heat sealable materials, including for example a blend of cellulose and thermoplastic fibers, such as SUPERSEAL supplied by J R Crompton, of Atlanta, Ga.

The role of the filter element F is critical to achieving a successful brewing cycle. In addition to possessing sufficient strength to withstand rupture by the pressure of the hot water being admitted via probe 26, the bottom of the filter must be reliably centered to avoid being pierced by the outlet probe 28. Moreover, the filter must be securely attached to the cup side wall, for otherwise the extract is likely to escape into chamber 24 where it will mix with the outflowing beverage.

SUMMARY OF THE INVENTION

Generally stated, the objective of the present invention is the provision of an improved method for efficiently forming, precisely inserting and reliably securing filter elements in the cup-shaped containers of the above-described beverage filter cartridges.

This and other related objectives, features and advantages will now be described in greater detail with reference to the accompanying drawings, wherein:

BRIEF DESCRIPTION OF THE DRAWINGS

FIG. 4A, 4B and 4C are diagrammatic illustrations, which, when arranged sequentially from left to right, depict successive stages in the method of the present invention;

FIG. 5 is a partial plan view taken on line 5—5 of FIG. 4A;

FIGS. 6A, 6B and 6C are sectional views taken respectively on lines 6A—6A, 6B—6B, and 6C—6C of FIG. 5;

DESCRIPTION OF PREFERRED EMBODIMENT

Figure 4B:
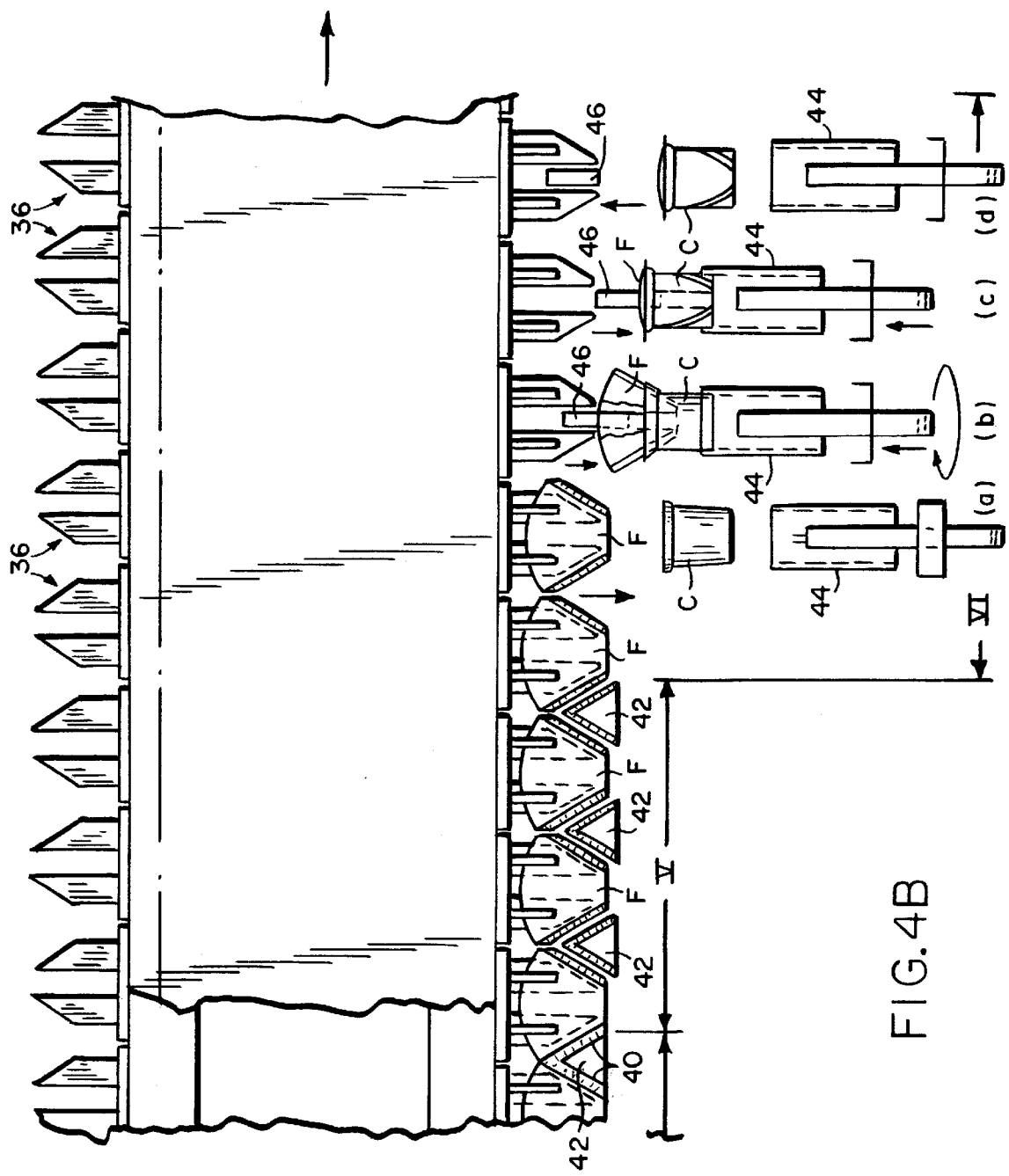
Figure 4C:
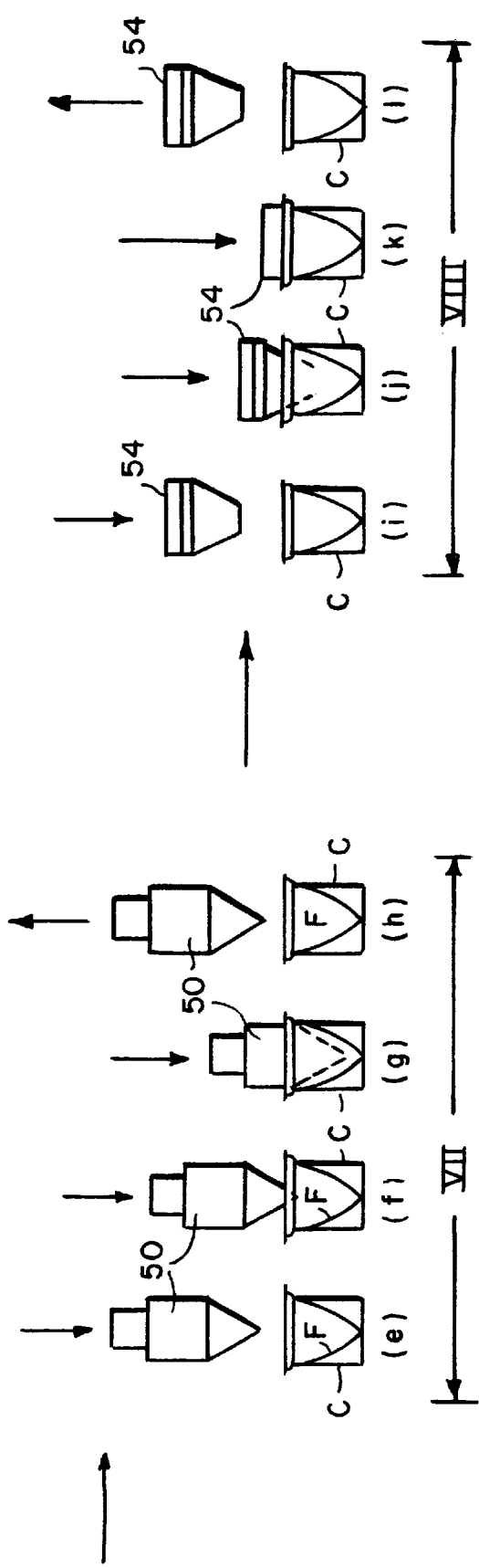

With reference initially to FIG. 4A, the method of the present invention begins at a folding station I where a flat continuous web of filter material 30 is received from a supply roll (not shown). As can best be seen by further reference to FIGS. 5 and 6A–6C, the flat web 30 is advanced between converging side plates 32 which serve to fold the web into two adjacent plies 30' which have separable upper edges, and which are joined one to the other along a bottom fold line 30".

At a second station II, the upper edges of the thus folded adjacent plies 30' are blanked into a scallop pattern, and the resulting scrap material 34 is removed and discarded.

Figure 7:
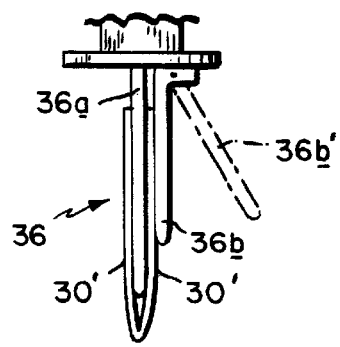
FIG. 7 is a sectional view on an enlarged scale taken along lines 7—7 of FIG. 4A.

At a third station III, carrier mandrels indicated typically at 36 on a chain drive 38 are inserted between the adjacent plies 30'. Each mandrel 36 includes a pair of flat plates 36a having beveled sides and defining spaces therebetween. As shown in FIG. 7, the mandrels also include cam operated fingers 36b which pivot from inoperative open positions 36b' to closed positions clamping one of the plies 30' against one side of the mandrel fingers 36a.

At a fourth station IV, the adjacent plies 30' are joined by heat sealing along seams 40 extending transversely with respect to the bottom fold line 30". The seams 40 define inverted V-shaped configurations which form the continuous web into a series of collapsed frustroconical filter elements interconnected by scrap segments 42 and supported internally by the mandrels 36.

Figure 1:
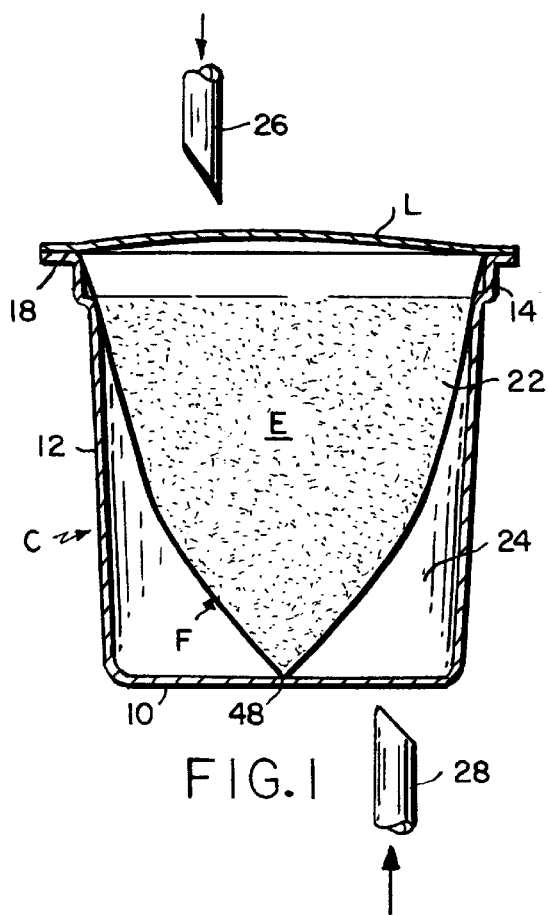
FIG. 1 is a sectional view taken through a filter cartridge containing a filter formed, inserted and secured by the method of the present invention.
Figure 2:
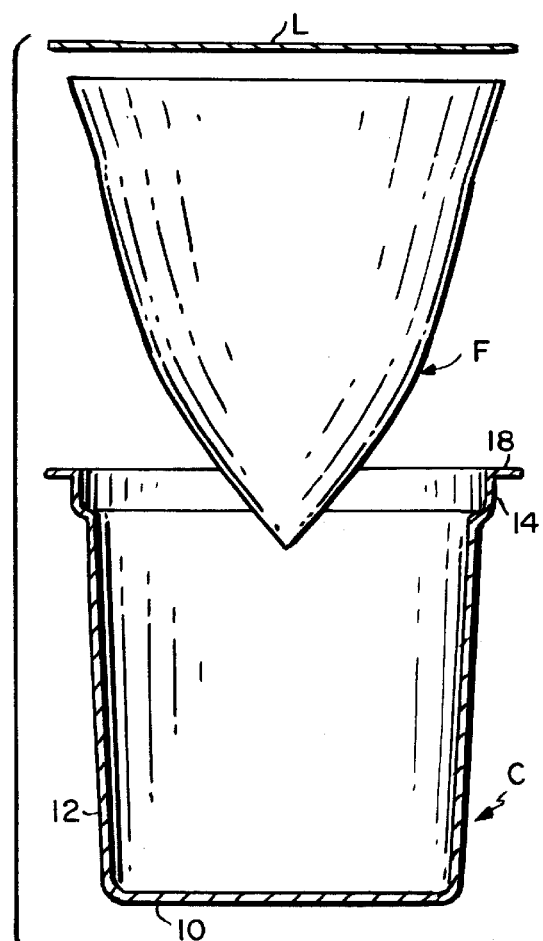
FIG. 2 is an exploded view of the filter cartridge components.

At a fifth station V, the scrap segments 42 are blanked and removed, thereby converting the continuous web into separate collapsed filter elements F. At a sixth station VI, the now separate collapsed filter elements F are inserted into the cup-shaped containers in the following stepped sequence:

(a) a collapsed filter element F is positioned over an underlying cup-shaped container C;

(b) the container C is elevated by a lifter 44 while being rotated about its axis. Simultaneously, a probe 46 is lowered between the mandrel fingers 36a to strip the filter element from the mandrel;

(c) the filter element F is inserted into the container C, with a heated tip on the probe 46 acting to tack weld the bottom of the filter element to the bottom 10 of the container C as at 48 (see FIG. 1);

(d) the probe 46 and lifter 44 are retracted in opposite directions, leaving the filter element loosely inserted and partially secured in the container.

At the next station VII, the filter element F is radially expanded outwardly against the interior side of the container C in the following stepped sequence;

(e) the container C with the loosely inserted filter F are positioned beneath a shaping mandrel 50;

(f) the shaping mandrel is lowered towards the underlying container;

(g) the shaping mandrel is at its lowermost position, radially expands the filter element against the interior side wall of the container;

(h) the shaping mandrel is withdrawn from the container, leaving the filter element in a radially expanded condition.

Figure 3:
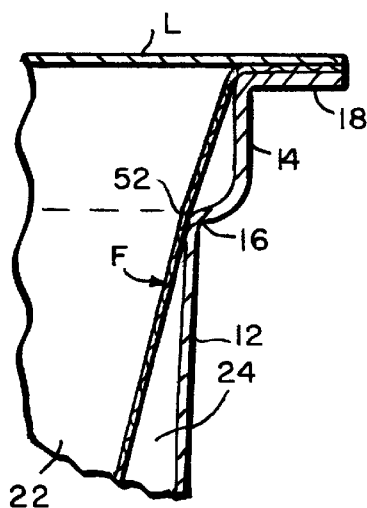
FIG. 3 is an enlarged partial sectional view of the filter cartridge.

At the final station VII, the filter element is peripherally welded as at 52 (see FIG. 3) to the interior side wall of the container in the following stepped sequence:

(i) the container C is aligned beneath a welding mandrel 54;

(j) the welding mandrel 54 is lowered into the cup;

(k) the welding mandrel effects a peripheral weld of the filter to the container side wall;

(l) the welding mandrel is withdrawn, leaving the filter element secured at its bottom as at 48 to the bottom of the container, and as at 52 peripherally to the container side wall.

With the filter element thus secured in place, the container may be carried forward through other processing stages (not shown) where the filter element will be charged with an extract E, after which the lid L will be applied to complete the filter package.

What is claimed is:

1. A method of forming and inserting filter elements into cup-shaped containers comprising the steps of:

a) folding a continuous web of filter material into two adjacent plies which have separable upper edges and are joined one to the other along a bottom fold line;

b) blanking said adjacent plies to form said upper edges into a scalloped pattern;

c) inserting carrier mandrels between said adjacent plies;

d) joining said adjacent plies along seams extending transversely with respect to said bottom fold line to form a series of collapsed frustoconical filter elements interconnected by scrap segments and supported internally by said carrier mandrels;

e) separating said filter elements one from the other by blanking and removing said scrap segments;

f) transferring said filter elements from said carrier mandrels into cup-shaped containers arranged therebeneath; and g) securing the thus inserted filter elements to interior surfaces of said cup-shaped containers.

2. The method of claim 1 wherein said filter material is heat sealable, and wherein the adjacent plies are joined one to the other along weld lines.

3. The method of claim 1 wherein said filter material is heat sealable, and wherein insertion of said filter elements into said cup-shaped containers is accompanied by tack welding said filter elements to the bottoms of said cup-shaped containers.

4. The method of claim 1 wherein said filter material is heat sealable, and wherein step (g) is effected by welding said filter elements to interior surfaces of said cup-shaped containers.

5. The method of claim 1 wherein step (g) is preceded by the step of expanding the thus inserted filter elements radially outwardly against the sides of said cup-shaped containers.

6. The method of claim 1 wherein step (c) is accompanied by a positive gripping of at least one of said plies against said mandrels.

* * * * *